United States Patent
Yoshiyuki et al.

(10) Patent No.: US 6,635,994 B1
(45) Date of Patent: Oct. 21, 2003

(54) METHOD AND APPARATUS FOR DEMAGNETIZING COLOR CRT

(75) Inventors: Kiya Yoshiyuki, Nishinomiya (JP); Kubota Osamu, Nishinomiya (JP); Hamada Tokihiko, Nishinomiya (JP); Yoda Seiji, Tokyo (JP); Hirose Haruo, Tokyo (JP)

(73) Assignees: Furuno Electric Co., Ltd., Hyogo (JP); Chuomusen Co., Ltd., Tokyo (JP)

( * ) Notice: Subject to any disclaimer, the term of this patent is extended or adjusted under 35 U.S.C. 154(b) by 0 days.

(21) Appl. No.: 09/700,149

(22) PCT Filed: Apr. 9, 1999

(86) PCT No.: PCT/JP99/01922

§ 371 (c)(1),
(2), (4) Date: Nov. 9, 2000

(87) PCT Pub. No.: WO99/62266

PCT Pub. Date: Dec. 2, 1999

(30) Foreign Application Priority Data

May 22, 1998 (JP) .......................................... P10-141584

(51) Int. Cl.[7] .............................................. H01F 13/00
(52) U.S. Cl. .............................. 315/8; 315/85; 361/150; 361/156

(58) Field of Search ................................. 361/150, 156; 315/8, 85

(56) References Cited

U.S. PATENT DOCUMENTS 3,733,524 A * 5/1973 Cooksey et al. ............ 361/150

* cited by examiner

*Primary Examiner*—David Vu
(74) *Attorney, Agent, or Firm*—Pillsbury Winthrop LLP

(57) ABSTRACT

By passing electric current through a degaussing coil within a vertical retrace period, a displayed image is prevented from disturbance and yet color blurs on the way of degaussing process are made indiscernible. In the process of discharging charges filled in capacitors C1 and C2 through the degaussing coil, a damped oscillation current by a closed loop of one of the capacitors and the degaussing coil is generated, and then a damped oscillation current of opposite polarity generated by a closed loop of the other capacitor and the degaussing coil is passed, within such a short time as color blurs in the degaussing process cannot be discerned and during the vertical retrace period. With these two damped oscillation currents paired, degaussing operation is fulfilled.

7 Claims, 9 Drawing Sheets

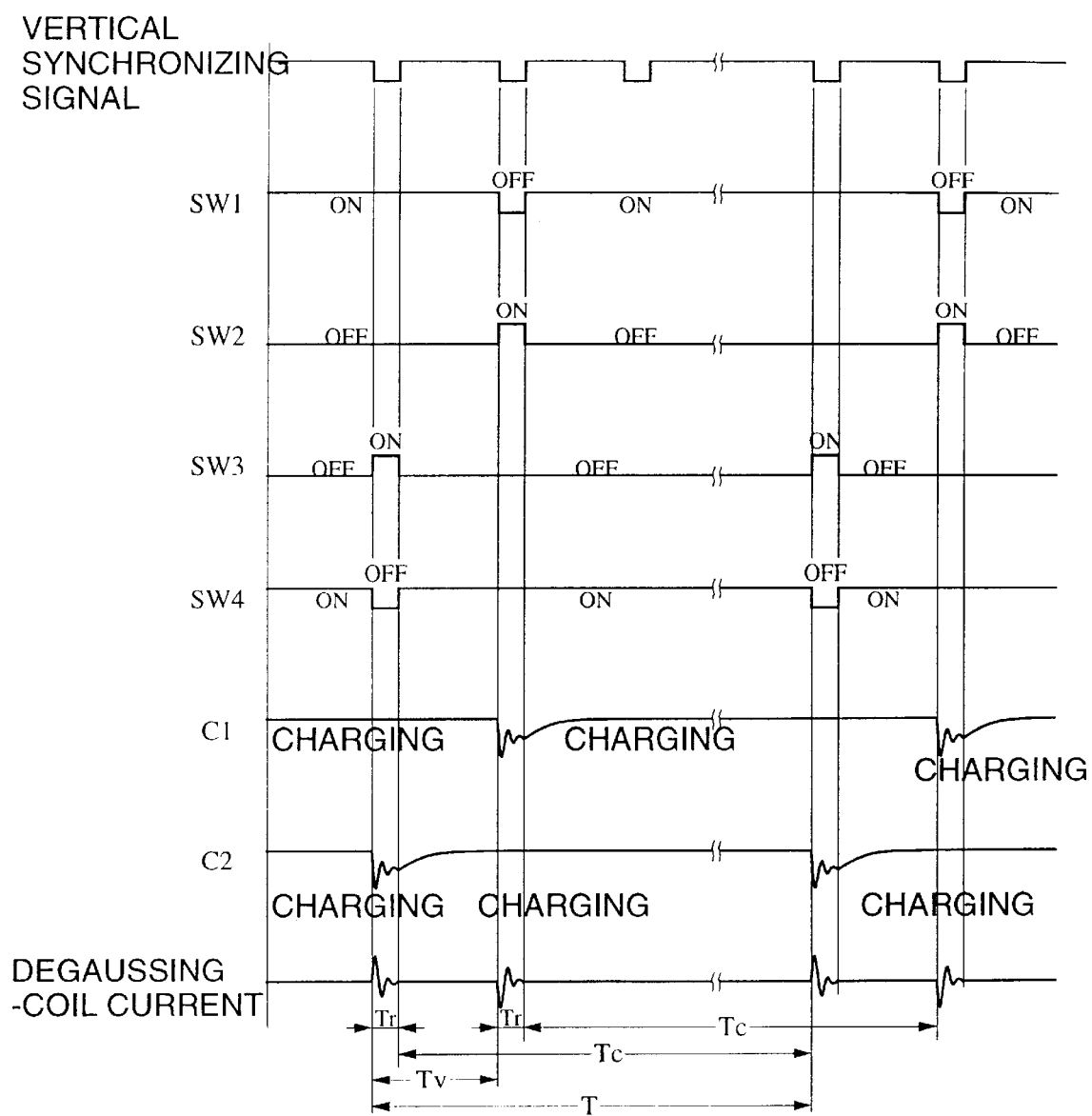

METHOD AND APPARATUS FOR DEMAGNETIZING COLOR CRT

BACKGROUND OF THE INVENTION

The present invention relates to a degaussing device and a degaussing method for color CRTs (Cathode Ray Tubes) in color video monitors, color TV receivers and the like.

Color CRTs used in color video monitors, color TV receivers and the like are generally subject to blurs or nonuniformities in display color under the effects of terrestrial magnetism or external magnetic fields (the blurs and nonuniformities will be referred to as "color blurs" hereinafter). This is due to the fact that an electron beam in a CRT is affected by magnetic fields before the beam reaches the fluorescent screen thereof. This results in a positional error of the arrival point (mis-landing) of the electron beam. In order to suppress such effects due to external magnetic fields, a magnetic shield made of an about 0.3 mm thick mild steel plate, which is called inner magnetic shield, is incorporated inside the color CRT, the magnetic shield constituting magnetic shielding in combination with a frame and a shadow mask or an aperture grille, which are soft magnetic materials. It is also practiced that a magnetic shield member of permalloy or amorphous material or the like is provided outside the color CRT, for example, along its housing.

These magnetic shielding members are magnetized by external magnetic fields applied, such as terrestrial magnetism. Since diamagnetic fields caused by the magnetized members are opposite in direction to the original magnetic fields applied from external, applied magnetic fields inside the magnetic shielding are canceled. However, if the magnetized state of the shielding members remains as it is (this state will be referred to as "residual magnetization" hereinafter), the canceling effect by diamagnetic fields can no longer be obtained when the direction of the color CRT is changed.

In order to remove the residual magnetization of the magnetic shield members, the shadow mask or an aperture grille and the like, there is provided a device for demagnetizing or degaussing by applying a damped oscillation magnetic field from outside of the color CRT.

Common degaussing devices degauss magnetic shield members within a color CRT by passing a damped oscillation current through a degaussing coil when the unit having the color CRT is powered on. However, electronic appliances having a color CRT used in ships and the like, color TV receivers for use in sightseeing buses, or the like, unlike appliances installed indoors, are subject to large changes in the direction of the color CRT in short time while the unit is being used. This gives rise to a need to perform the degaussing from time to time during the use of the unit. However, as a current flow through the degaussing coil at arbitrary timing would cause the display image to be disturbed, degaussing during the use of the unit is fulfilled by a method as shown in FIG. 9. Electric current is passed through the degaussing coil during a vertical retrace period. This vertical retrace period varies depending on the resolution of display. FIG. 9A shows a display example in VGA (480×640 pixels), and FIG. 9B shows an example of high definition display in S-VGA (600×800 pixels) or XGA (768×1024 pixels) or the like. Thus, the higher the definition of display, the shorter the vertical retrace period, with the results of not only reduced degaussing effect for one passage of damped oscillation current but also a residual magnetization toward the direction of magnetic flux generated by the first peak of degaussing current.

As devices that perform the degaussing during the use of the unit as described above, there have been known (1) Japanese Patent Laid-Open Publication HEI 5-236488, (2) Japanese Patent Laid-Open Publication HEI 8-275188, and (3) Japanese Patent Laid-Open Publication SHO 59-148484.

With the degausser disclosed in the Japanese patent publication (1), in synchronization with a vertical retrace pulse of a vertical output signal, damped oscillation magnetic flux is generated by a degaussing coil and the direction in which the damped oscillation magnetic flux is generated is inverted alternately. With this arrangement, there will be prevented the residual magnetization toward the direction of magnetic flux generated by the first peak of degaussing current. However, it is disclosed that the inversion cycle of the direction in which the damped oscillation magnetic flux is generated is set to a time period of from several seconds to several tens of seconds. Polarity inversion at such intervals would cause the residual magnetization to persist for at least some inversion cycles, so that color blurs during the period would not be eliminated. With the degausser disclosed in the Japanese patent publication (2), an alternating voltage is applied to the degaussing coil once every about 1 second in synchronization with the vertical synchronizing signal, and each time the alternating voltage is applied, the polarity of the alternating voltage is inverted. With such a method, however, damped oscillation magnetic flux could not be generated by the degaussing coil, and moreover because of long intervals of polarity inversion, color blurs that would occur during those intervals would be discerned. With the degausser disclosed in the Japanese patent publication (3), a single pulse in phase with the vertical synchronizing signal is generated every other vertical synchronizing signal, and the polarity of the pulse is inverted alternately every vertical retrace period while a damped oscillation current is generated with its amplitude decreasing, by which degaussing is fulfilled. With this method, there would occur color blurs within a period lasting until the damped oscillation current is damped enough, and those color blurs would be discerned. For example, in the case of a vertical synchronizing signal having a frequency of 60 Hz, since one circle period is about 16 ms, the process in which color blurs are eliminated would be discerned over a period of 160 ms on condition that, for example, damping is iterated 10 times before completion.

SUMMARY OF THE INVENTION

An object of the present invention is to provide a degaussing device and a degaussing method for color CRTs which have solved the above-mentioned problems and in which a current flow through the degaussing coil is effected during the vertical retrace period so that any disturbance of display images is prevented and that color blurs in halfway stages during the degaussing process are made indiscernible.

In order to achieve the object, the present invention provides a degaussing device for color CRTS which comprises degaussing-current passing means for passing a first damped oscillation current within a vertical retrace period of a signal fed to a color CRT, which starts with a specified polarity and swings both positively and negatively through a degaussing coil of a color CRT, and passing a second damped oscillation current opposite in polarity to the first damped oscillation current through the degaussing coil of the color CRT; and timing control means for making both the first damped oscillation current and the second damped oscillation current sequentially passed for the same times within such a short time as color blurs cannot be discerned and during a vertical retrace period.

FIGS. 1A and 1B show examples of the relationship between a vertical retrace period Tr and the first and second damped oscillation currents. FIG. 1A shows an example in which the first damped oscillation current and the second damped oscillation current are sequentially passed in two vertical retrace periods Tr adjacent to each other on the time base. By passing damped oscillation currents opposite in polarity to each other through the degaussing coil in two vertical retrace periods within such a short time as color blurs in the degaussing process cannot be discerned, as exemplified by two vertical retrace periods adjacent to each other on the time base, there will be canceled the residual magnetization due to the biasing of the damped oscillation magnetic flux toward one direction. Moreover, because of a short time interval between the passage of the first damped oscillation current and the passage of the second damped oscillation current, color blurs during the interval therebetween cannot be discerned. In particular, when the first damped oscillation current and the second damped oscillation current are sequentially passed in two vertical retrace periods adjacent to each other on the time base, the residual magnetization due to the biasing of the damped oscillation magnetic flux toward one direction is canceled in the shortest time, so that the time required for degaussing is reduced to a large extent.

FIG. 1B shows an example in which the first damped oscillation current and the second damped oscillation current are sequentially passed within one vertical retrace period Tr. By passing damped oscillation currents opposite in polarity to each other through the degaussing coil within a vertical retrace period, the residual magnetization due to the biasing of the damped oscillation magnetic flux toward one direction is canceled. Moreover, since the damped oscillation magnetic flux is generated only during the vertical retrace period, there do not occur color blurs in the degaussing process themselves.

The present invention also provides a degaussing device for color CRTS as described above, wherein the degaussing-current passing means comprises capacitors connected in series to both ends of the degaussing coil respectively, switch devices provided between both ends of the capacitors and a common potential respectively, and a DC power supply connected to one-side ends of the two capacitors respectively, and wherein the timing control means turns the switch devices ON or OFF in synchronization with a vertical synchronizing signal.

Thus, by connecting capacitors in series to both ends of the degaussing coil and selectively passing filled charges of either one of the two capacitors, it becomes possible to change over the first damped oscillation current and the second damped oscillation current to each other in vertical retrace periods within such a short time as color blurs in the degaussing process cannot be discerned, or within one vertical retrace period, even if the charging of the capacitors takes a long time.

BRIEF DESCRIPTION OF THE DRAWINGS

FIG. 3 is a waveform diagram for explaining the operation of the device;

DETAILED DESCRIPTION OF THE PREFERRED EMBODIMENTS

The construction of a degaussing device for color CRTs according to a first embodiment of the present invention will be explained with reference to FIGS. 2A, 2B and FIG. 3.

Figure 2A:
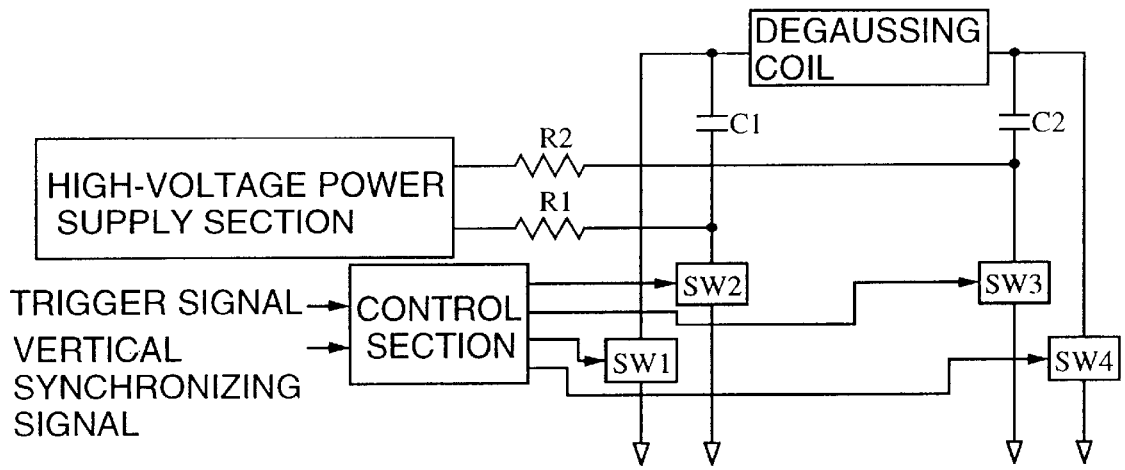
FIGS. 2A and 2B are a block diagram showing the construction of a degaussing device for color CRTs according to a first embodiment of the invention, and a partial flowchart thereof, respectively.

FIG. 2A is a circuit diagram of the device. Capacitors C1 and C2 are connected in series to both ends of a degaussing coil respectively. Switch devices SW1 and SW2 are connected between both ends of the capacitor C1 and the common potential (ground) respectively, and switch devices SW3 and SW4 are connected between both ends of the capacitor C2 and the common potential (ground) respectively. A DC high-voltage power supply section is connected to one-side ends of the capacitors C1 and C2 through resistors R1 and R2 respectively. Also, the control section is provided with vertical synchronizing signals and trigger signals applied to control ON or OFF of the four switch devices SW1, SW2, SW3 and SW4 at specified timings respectively. The DC high-voltage power supply section is, for example, a power supply section for generating a screen voltage to be applied to a screen electrode of a color CRT, and generates a DC high voltage of, for example, 300–600 V.

FIG. 3 is a waveform diagram showing states of individual parts of FIG. 2A during the operation. With the switch devices SW1 through SW4, their ON or OFF states are shown according to the state of either high level or low level. With the capacitors C1 and C2, their charging voltage waveform is shown. States of the degaussing coil is shown in its flowing-current waveform.

Operation of the device shown in FIG. 2A will be explained with reference to FIG. 3. It is now assumed that a trigger signal is inputted from external. First, with the switch devices SW1 and SW4 in an ON state (closed state) and with the switches SW2 and SW3 OFF (open state), a high voltage is applied from the high-voltage power supply section to the capacitors C1 and C2 through the resistors R1, R2 respectively, so that the capacitors C1 and C2 are charged. Next, when the switch device SW4 turns OFF and the switch device SW3 turns ON, a closed loop of the capacitor C2 and the degaussing coil with the aid of SW1 and SW3 is made up. An RLC series resonant loop circuit (referred to simply as "closed loop" hereinafter) is made up, since the degaussing coil is equivalently represented by a series circuit of an inductor L and a resistor R. Since an output voltage of the high-voltage power supply section is a positive voltage, filled charges of the capacitor C2 start to be discharged in a route of the capacitor C2, the switch SW3, the switch SW1, the degaussing coil and the capacitor C2, but afterwards, a damped oscillation current based on a motive voltage given by the filled charges of the capacitor C2 flows through the degaussing coil. An ON period Tr of the switch SW3 is equal to a vertical retrace period, and a first damped oscillation current is passed through the degaussing coil during this vertical retrace period. After that, when the switch SW3 turns OFF and the switch SW4 turns ON, the capacitor C2 is recharged.

Referring to FIG. 3, Tv is a time period equivalent to one cycle period of vertical scanning, and during the subsequent vertical retrace period, the switch SW1 turns OFF and the switch SW2 turns ON. As a result, a closed loop of the capacitor C1 and the degaussing coil the switches SW4 and SW2 is made up, so that a second damped oscillation current due to the RLC series circuit is passed through the degaussing coil. The damped oscillation current flowing through the degaussing coil in this case is opposite in polarity to the first damped oscillation current. Then, when the switch SW1 turns ON and the switch SW2 turns OFF, the capacitor C1 starts to be charged.

In addition, whereas charging time constants for the capacitors C1 and C2 depend on the output impedance of the high-voltage power supply section, series resistances and electrostatic capacities of the capacitors C1 and C2, the charging time constants are set to relatively large values by taking large values of the series resistances because the output current capacity of the high-voltage power supply section is normally small. However, the capacitors C1 and C2 are charged up to a voltage generally equal to the output voltage of the high-voltage power supply section (i.e., charging is completed) at least in a charging time Tc shown in FIG. 3.

Thereafter, similar operation will be iterated at a cycle period T. This period T, which is the interval for degaussing, is set to a certain time such as several seconds or several minutes. Without the degaussing interval T being fixed, degaussing may be effected by a trigger applied when the azimuth of the CRT has changed over a specified angle (e.g., 45°). As an example, in the case of an electronic appliance provided in a ship, a circuit for giving a trigger signal to the control section shown in FIG. 2A may appropriately be so arranged as to detect the heading of the ship, and to generate a trigger signal when the angle of the ship heading has changed over 45° since the generation of the preceding trigger signal. FIG. 2B is a control flowchart on the CPU (not shown) side for such generation of the trigger signal. In FIG. 2B, by timer interruption, a current ship heading is fetched from, for example, a gyro instrument, where if this current ship heading has changed by 45° from the ship heading at the time of generation of the preceding trigger signal, then a new trigger signal is generated. Such a constitution may also be implemented by a control section of the degaussing device shown in FIG. 2A, and moreover may be applied widely to common mobile objects without being limited to ships.

Further, it may also be arranged to provide a degaussing button which generates a trigger signal when operated, thus enabling an operator to effect the degaussing at any arbitrary timing. In either case, however, it is only during the vertical retrace period that the damped oscillation current is actually passed through the degaussing coil, so that the displayed image is never disturbed.

Next, the construction of a degaussing device for color CRTs according to a second embodiment of the invention will be explained with reference to FIGS. 4 and 5.

Figure 2B:
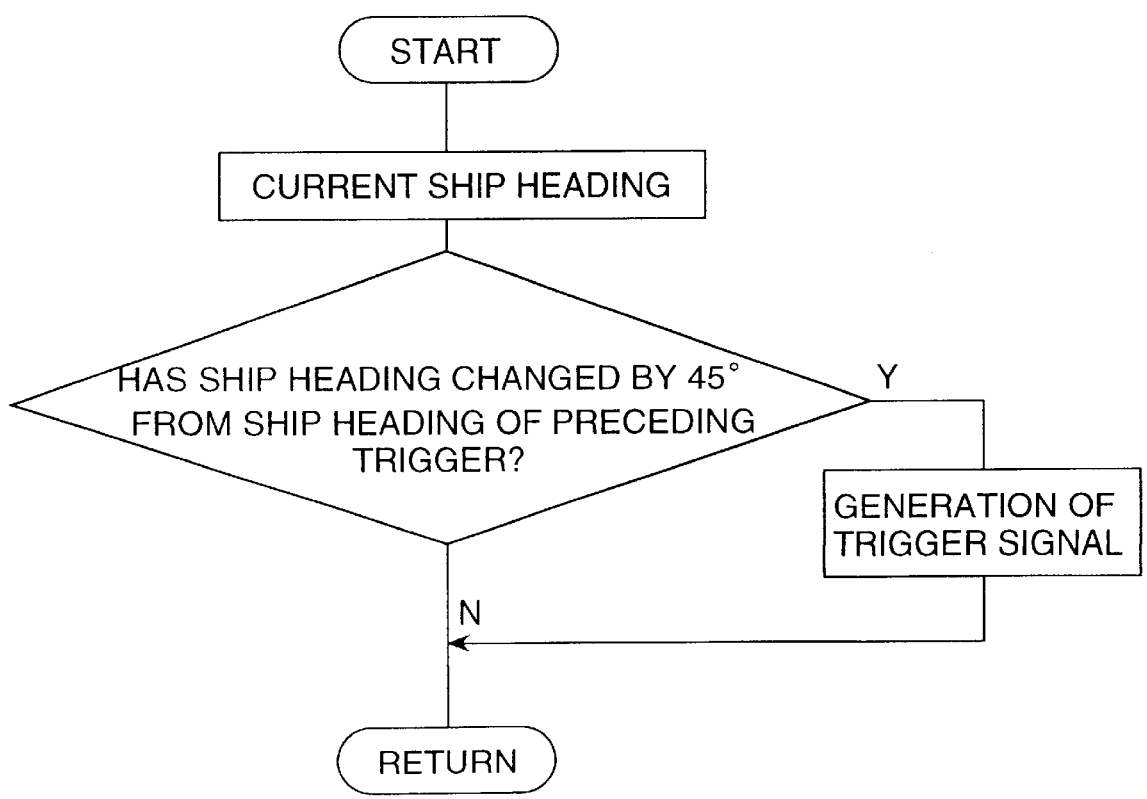

With the, embodiment of the invention shown in FIGS. 2A and 2B, a DC voltage for charging is applied to one terminals of capacitors, with the other terminals connected to the degaussing coil. As another arrangement, the high-voltage power supply section can be connected to junction points between the capacitors and the degaussing coil as shown in FIG. 4.

Figure 4:
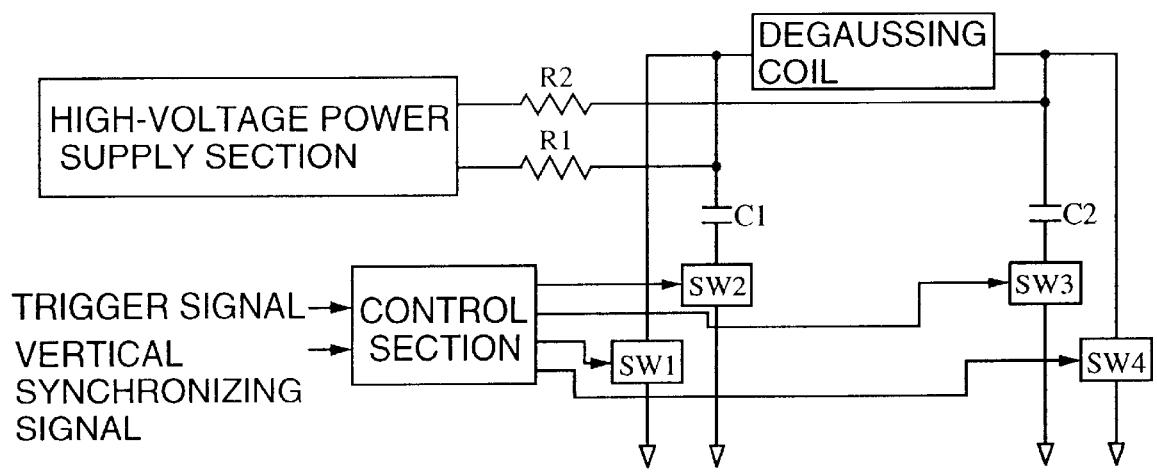
FIG. 4 is a block diagram showing the construction of a degaussing device for color CRTs according to a second embodiment of the invention.
Figure 5:
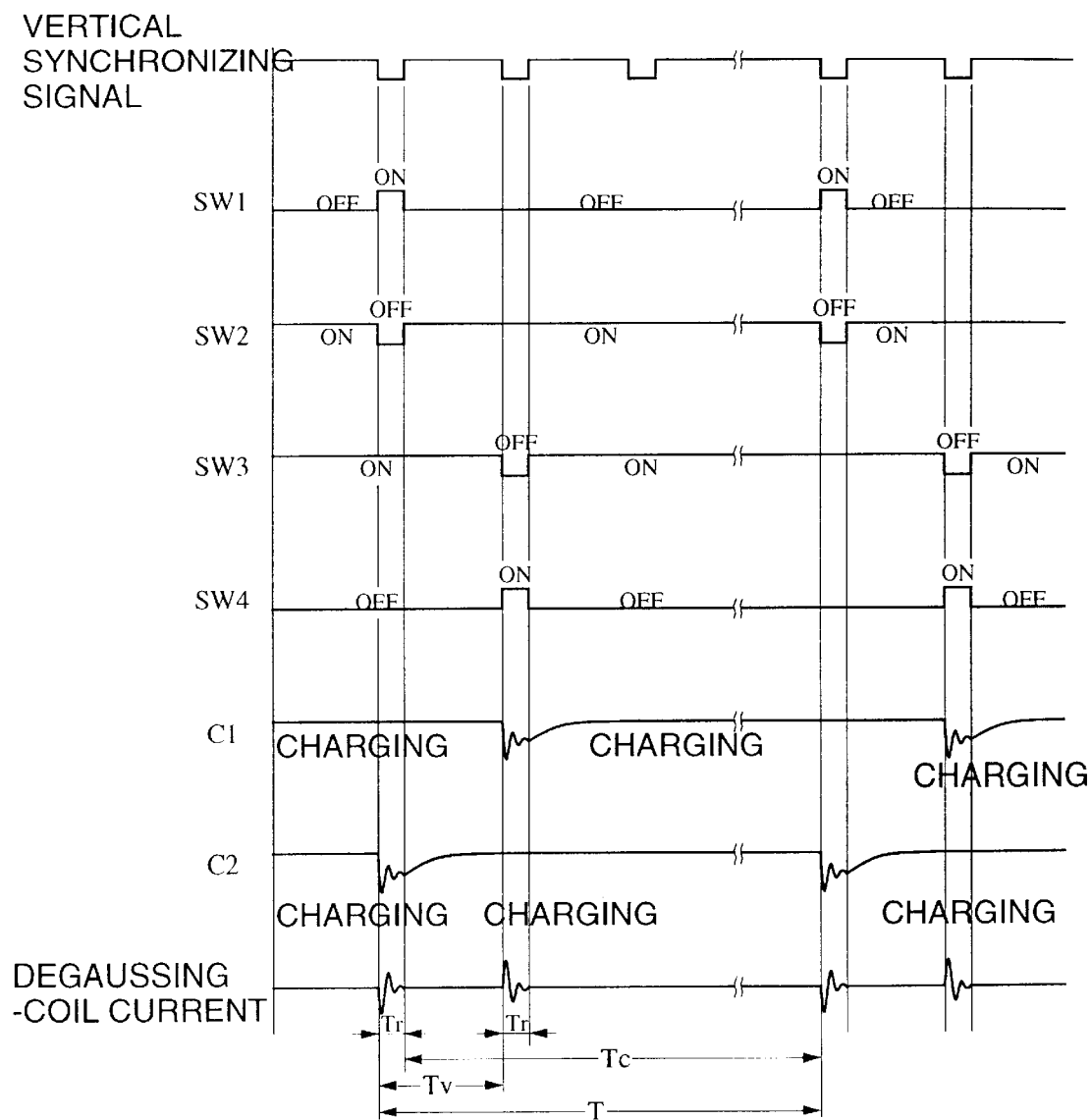
FIG. 5 is a waveform diagram showing the operation of the device.

FIG. 5 is a waveform diagram showing electric states of individual parts of the embodiment shown in FIG. 4 during the operation. As in the case of FIG. 3, the operation of the switch devices SW1 through SW4 are illustrated in their ON and OFF states according to the states of either high level and low level respectively. With the capacitors C1 and C2, their charging voltage waveforms are shown. With the degaussing coil, its flowing-current waveform is shown.

Operation of the device shown in FIG. 4 will be explained with reference to FIG. 5. First, with the switches SW2 and SW3 in an ON state and with the switches SW1 and SW4 OFF, a high voltage is applied from the high-voltage power supply section to the capacitors C1 and C2 through the resistors R1 and R2 respectively, so that the capacitors C1 and C2 will be charged. Next, when the switch SW2 turns OFF and the switch SW1 turns ON, a closed loop of the capacitor C2 and the degaussing coil through the switches SW1 and SW3 is formed. As a result, a damped oscillation current based on a motive voltage provided by the filled charges of the capacitor C2 flows through the degaussing coil. An ON period Tr of the switch SW1 is equal to a vertical retrace period, and a first damped oscillation current is passed through the degaussing coil during this vertical retrace period. Then, when the switch SW1 turns OFF and the switch SW2 turns ON, the capacitor C2 is recharged. When the switch SW3 turns OFF and the switch SW4 turns ON during the succeeding vertical retrace period, a closed loop of the capacitor C1 and the degaussing coil through the switches SW4 and SW2 is made up, so that a second damped oscillation current based on a motive voltage given by the filled charges of the capacitor C1 flows through the degaussing coil. The second damped oscillation current is opposite in polarity to the first damped oscillation current. Then, when the switch SW3 turns ON and the switch SW4 turns OFF, the capacitor C1 starts to be charged.

Thereafter, similar operations will be iterated at a cycle period T.

Next, the construction of a degaussing device for color CRTs according to a third embodiment of the invention will be explained with reference to FIGS. 6 and 7.

Figure 6:
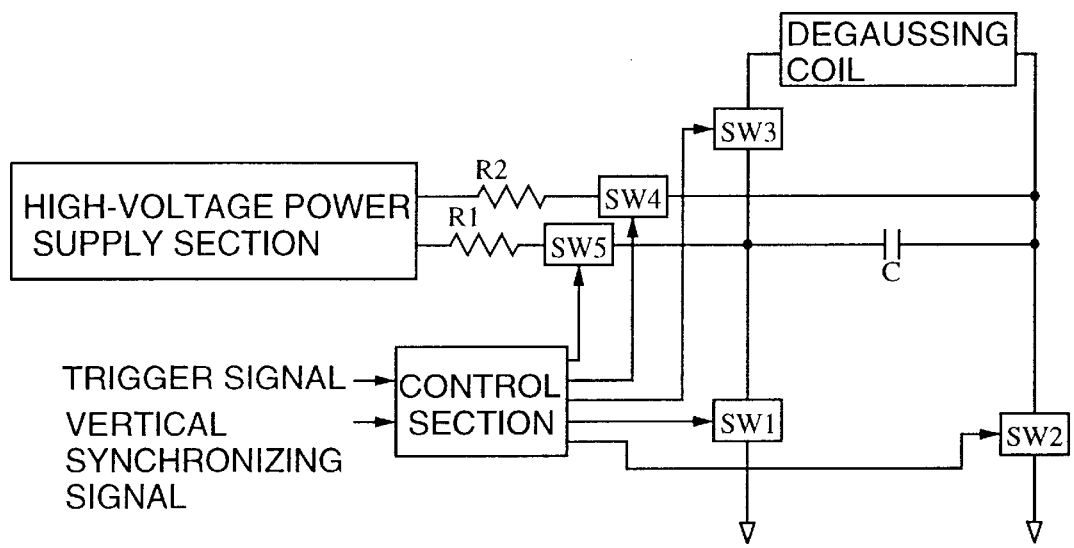
FIG. 6 is a block diagram showing the construction of a degaussing device for color CRTs according to a third embodiment of the invention.
Figure 7:
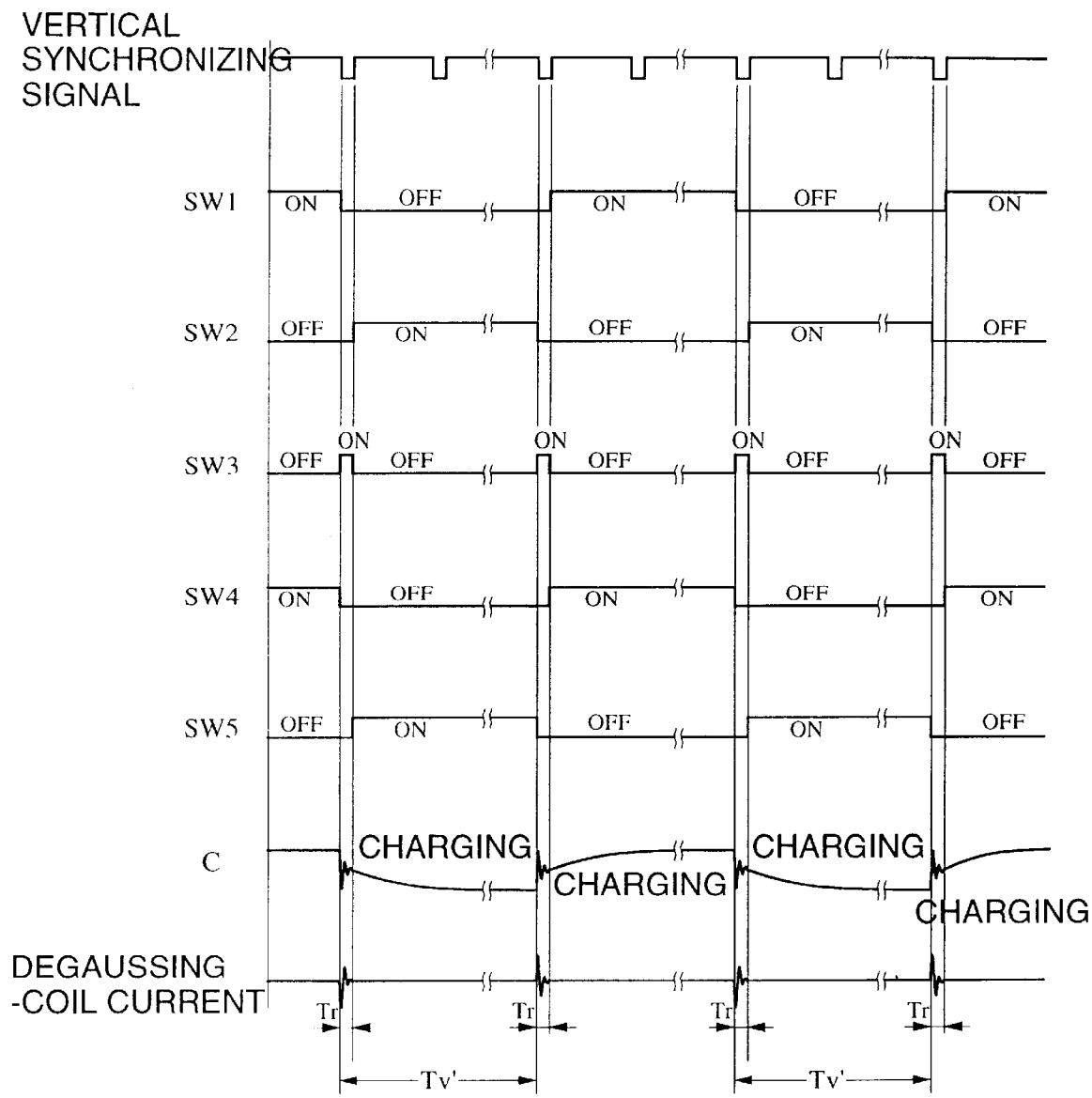
FIG. 7 is a waveform diagram showing the operation of the device.

As shown in FIG. 6, with this embodiment, a closed loop of a degaussing coil and a capacitor C through the switch device SW3 is formed, while switch devices SW1 and SW2 are connected between both ends of the capacitor C the common potential (ground) respectively. Further, an output voltage of the high-voltage power supply section is applied to both ends of the capacitor C through resistors. R1 and R2 and switch devices SW4 and SW5 respectively. The rest of the construction is similar to the one shown in FIGS. 2A and 2B.

Operation of the circuit shown in FIG. 6 will be explained with reference to the waveform diagram shown in FIG. 7. First, assuming that the switches SW1 and SW4 are in an ON state and the other switching devices in an OFF state, an output voltage of the high-voltage power supply section is supplied to the capacitor C through the switches SW1 and SW4 so that the capacitor C will be charged. Next, when the switch SW3 turns ON and the switches SW1 and SW4 turn OFF during a vertical retrace period Tr, a closed loop of the capacitor C and the degaussing coil through the switch SW3 is made up, so that a first damped oscillation current flows through the degaussing coil. Then, when the switch SW3 turns OFF and the switches SW2 and SW5 turn ON, the capacitor C is charged in a direction opposite to the foregoing one. During a following vertical retrace period Tr, when the switch SW3 turns ON again and the switches SW2 and SW5 turn OFF, a second damped oscillation current opposite in polarity to the foregoing damped oscillation current is passed through the degaussing coil. Then, when switch SW3 turns OFF and the switches SW1 and SW4 turn ON, the capacitor C will be charged at the same polarity as in the original state. This period Tv' is such a short time as cannot be discerned. Since Tv' can be shortened by enlarging the output current capacity of the high-voltage power supply section and further lessening the charging time constant, it is also possible that the first and second damped oscillation currents are passed through the degaussing coil in two vertical retrace periods adjacent to each other on the time base.

Figure 8:
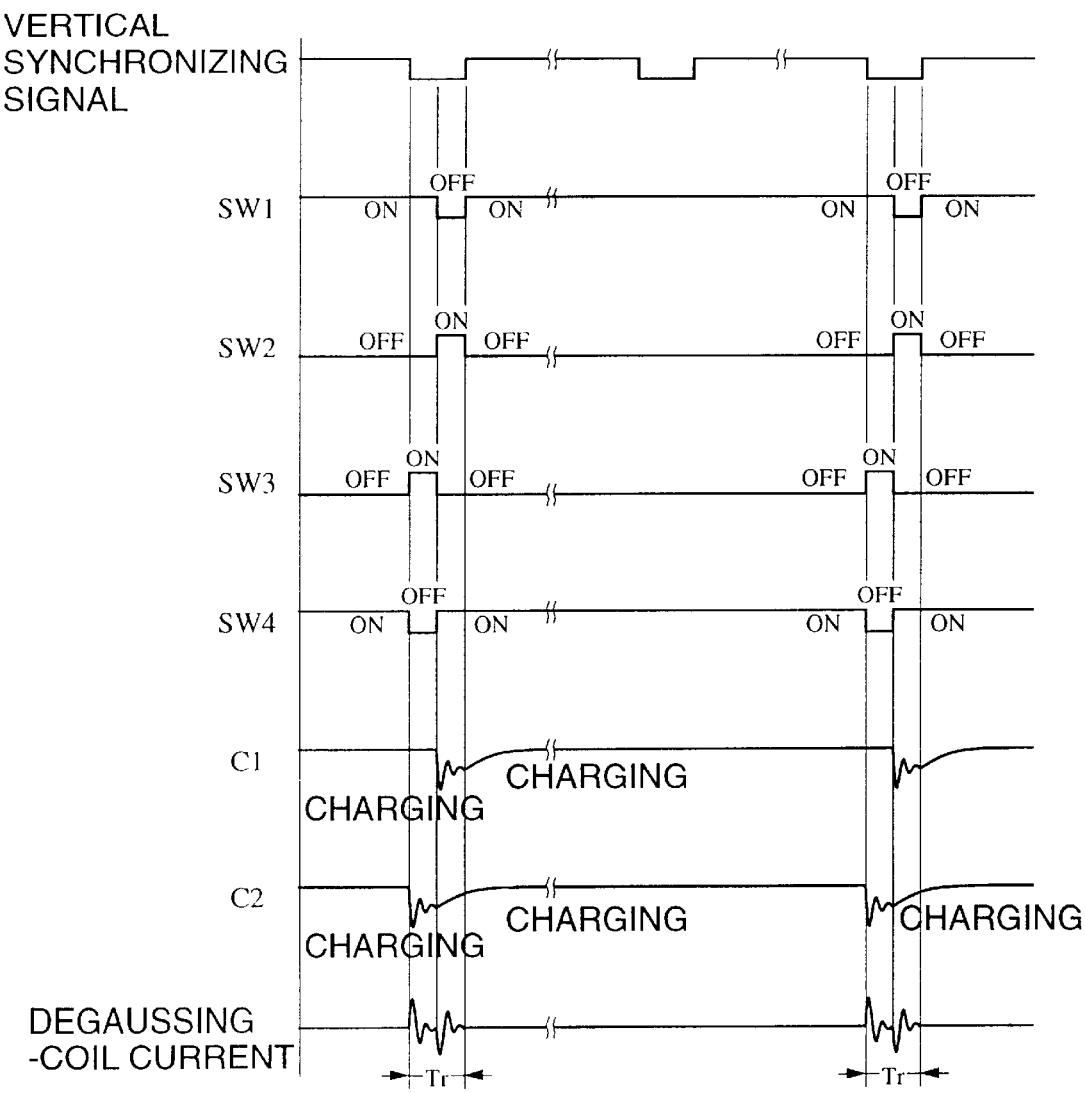
FIG. 8 is a waveform diagram showing the operation of a degaussing device for color CRTs according to a fourth embodiment of the invention.
Figure 9A:
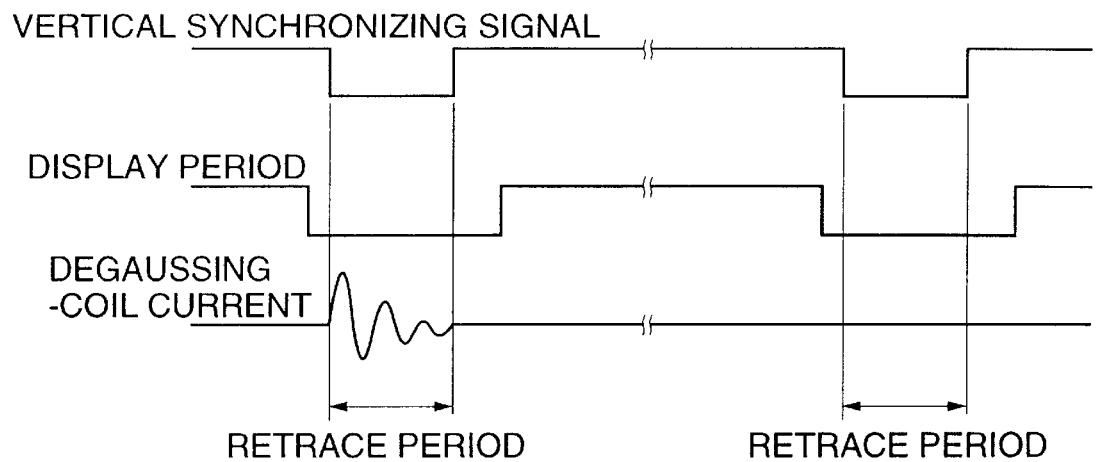
FIGS. 9A and 9B are charts showing the relationship between vertical retrace periods and degaussing-coil current in a prior art degaussing device.
Figure 9B:
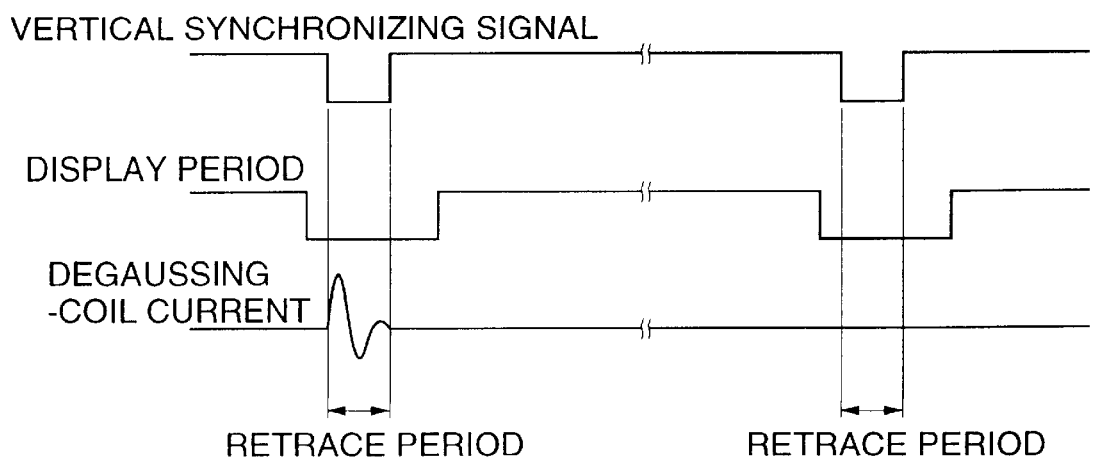

Next, the construction of a degaussing device for color CRTs according to a fourth embodiment of the invention will be explained with reference to FIG. 8.

Figure 1A:
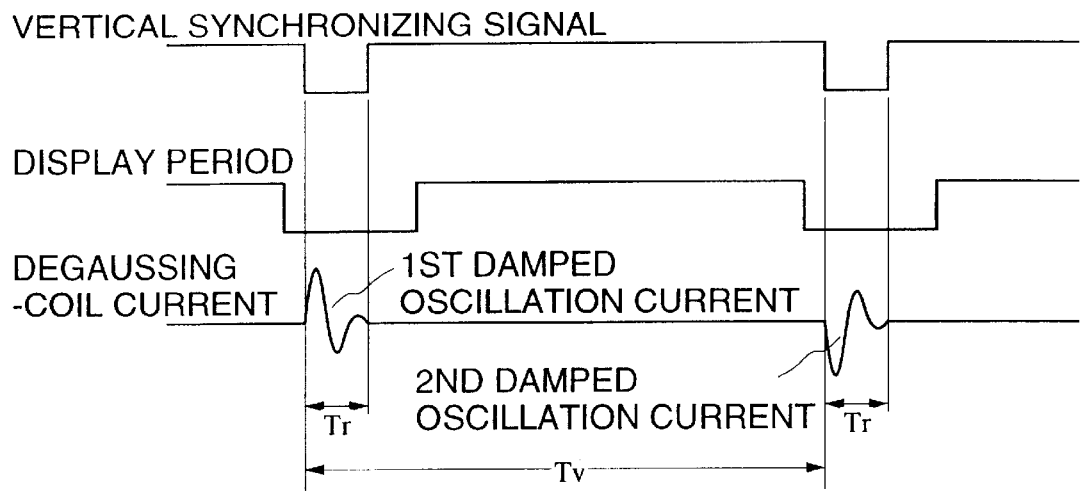
FIGS. 1A and 1B are charts showing the relationship between vertical synchronizing signals and degaussing-coil current in a degaussing device for color CRTs in which the present invention is embodied.
Figure 1B:
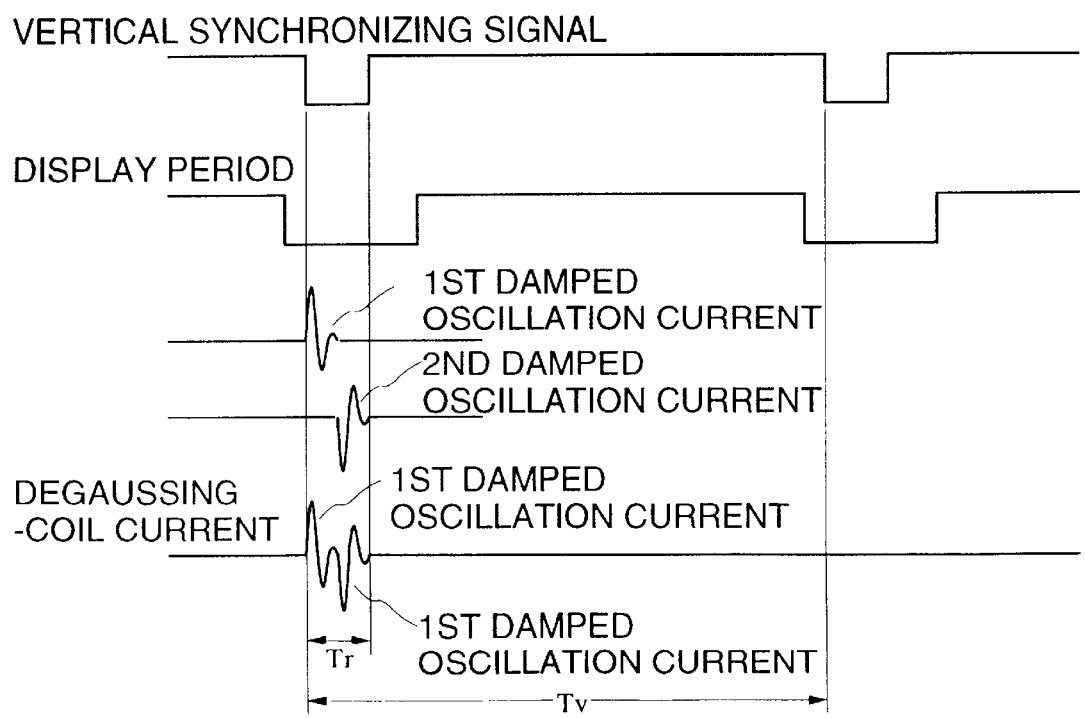

With this embodiment, as shown in FIG. 1B, first and second damped oscillation currents are passed sequentially through the degaussing coil within one vertical retrace period. This embodiment is similar in circuit construction to the embodiment shown in FIGS. 2A and 2B, but differs therefrom in timing control of the control section. FIG. 8 is a waveform diagram showing the timing relation. With this fourth embodiment, unlike the one shown in FIG. 3, a first damped oscillation current is passed through the degaussing coil by turning the switch. SW3 ON and the switch SW4 OFF in the first half of the vertical retrace period Tr. Then, by turning the switch SW3 OFF and the switch SW4 ON and moreover turning the switch SW2 ON and the switch SW1 OFF in the second half of the vertical retrace period Tr, a second damped oscillation current is passed through the degaussing coil. After an end of the first half of the vertical retrace period Tr, the capacitor C2 starts to be charged as the switch SW4 is turned ON. The capacitor C1 starts to be charged as the switch SW1 is turned ON after the second half of the vertical retrace period Tr.

Thus, by passing the first and second damped oscillation currents sequentially within one vertical retrace period, any bias of the damped oscillation magnetic flux toward one direction is diminished in a very short time. This improves the degaussing efficiency.

In the case where the degaussing operation is not completed in one vertical retrace period but performed several times, it is appropriate that operations of passing the first and second damped oscillation currents during the vertical retrace period are effected a specified number of times every time the charging of the capacitors C1 and C2 is completed. When the charging of the capacitors C1 and C2 is completed within one period of vertical scanning because of small charging time constants of the capacitors C1 and C2, it is also possible that the first and second damped oscillation currents are passed successively several times during each vertical retrace period.

With the foregoing embodiments, the degaussing is fulfilled by sequentially passing through the degaussing coil two damped oscillation currents opposite in polarity to each other. It is also possible that the polarity of a damped oscillation current to be passed through the degaussing coil is changed a plurality of times in one degaussing operation.

For example, with the embodiment shown in FIGS. 2A and 2B, the degaussing can be performed when a trigger signal is inputted to the control section by carrying out one set of operations. The operations include a passage of the first damped oscillation current through the degaussing coil by charging and discharging of the capacitor C2, a passage of the second damped oscillation current through the degaussing coil by charging and discharging of the capacitor C1, a passage of the first damped oscillation current through the degaussing coil by charging and discharging of the capacitor C2, and a passage of the second damped oscillation current through the degaussing coil by charging and discharging of the capacitor C1. Thus, when the first damped oscillation current and the second damped oscillation current are passed sequentially during the vertical retrace period, the first and second damped oscillation currents may be passed each an equal number of times through the degaussing coil in such a short time as cannot be discerned so that any residual magnetization due to the passage of damped oscillation currents through the degaussing coil is canceled. Further, in the case where the first damped oscillation current and the second damped oscillation current are passed sequentially within one vertical retrace period, the first and second damped oscillation currents may be passed through the degaussing coil each an equal number of times within the vertical retrace period.

As explained above, damped oscillation currents opposite in polarity to each other and swinging both positively and negatively are passed through the degaussing coil sequentially during the vertical retrace period within such a short time as color blurs in the degaussing process cannot be discerned, or during the vertical retrace period. As a result, residual magnetization due to the biasing of the damped oscillation magnetic flux toward one side is canceled, and color blurs between a flow of the first damped oscillation current and a flow of the second damped oscillation current are not discerned.

When the first damped oscillation current and the second damped oscillation current are passed sequentially in two vertical retrace periods adjacent to each other on the time base, residual magnetization due to the biasing of the damped oscillation magnetic flux toward one side is canceled in the shortest possible time, so that the time required for degaussing is extremely shortened.

When the first damped oscillation current and the second damped oscillation current are passed sequentially within one vertical retrace period, the biasing of the damped oscillation magnetic flux toward one side is canceled during one vertical retrace period, so that the degaussing efficiency is improved. Further, since the biasing of the damped oscillation magnetic flux toward one side is canceled within the vertical retrace period, a color-blurred state due to the biasing of the damped oscillation magnetic flux is never displayed during the display periods.

Further, in the case where capacitors are connected in series to both ends of the degaussing coil, respectively, and where filled charges of either one of the two capacitors are selectively passed through the degaussing coil, even if the output current capacity of the power supply section that generates the charging voltage for the capacitors is small and so the charging time is prolonged, the first damped oscillation current and the second damped oscillation current can be switched over in a vertical retrace period within such a short time as color blurs in the degaussing process cannot be discerned, or within one vertical retrace period.

INDUSTRIAL APPLICABILITY

The present invention is useful for effectively degaussing magnetic shield members, shadow masks, aperture grilles and the like in color CRTs for use in electronic equipment mounted on mobile objects such as ships.

What is claimed is:

1. A degaussing device for color CRTS, comprising:

degaussing-current passing means for passing, through a degaussing coil of a color CRT, a first damped oscillation current which starts with a specified polarity and swings both positively and negatively, and passing a second damped oscillation current opposite in polarity to the first damped oscillation current through the degaussing coil of the color CRT; and timing control means for making the first damped oscillation current and the second damped oscillation current sequentially passed in two vertical retrace periods adjacent to each other on the time base, respectively.

2. A degaussing device for color CRTs, comprising:

degaussing-current passing means for passing, through a degaussing coil of a color CRT, a first damped oscillation current which starts with a specified polarity and swings both positively and negatively, and passing a second damped oscillation current opposite in polarity to the first damped oscillation current through the degaussing coil of the color CRT; and timing control means for making the first damped oscillation current and the second damped oscillation current sequentially passed in a vertical retrace period.

3. The degaussing device for color CRTs according to claim 1 or 2, wherein the timing control means effects the sequential current passage in specified cycle periods.

4. The degaussing device for color CRTs according to any one of claims 1 through 3, further comprising means for receiving an azimuth signal from a mobile object, wherein the timing control means commences the sequential current passage when the azimuth signal has changed over a specified angle from an azimuth of the preceding sequential current passage.

5. The degaussing device for color CRTs according to any one of claims 1 through 4, wherein the degaussing-current passing means comprises: capacitors connected in series to both ends of the degaussing coil, respectively; switch devices provided between both ends of the capacitors and a common potential, respectively; and a DC power supply connected to one-side ends of the two capacitors, respectively, and wherein the timing control means turns ON/OFF the switch devices in synchronization with a vertical synchronizing signal.

6. A degaussing method for color CRTs, comprising a step of sequentially performing following current passages (A) and (B) in two vertical retrace periods of a color CRT, the two vertical retrace periods being adjacent to each other on the time base:

(A) passing, through a degaussing coil of the color CRT, a first damped oscillation current which starts with a specified polarity and which swings both positively and negatively; and (B) passing, through the degaussing coil of the color CRT, a second damped oscillation current opposite in polarity to the first damped oscillation current.

7. A degaussing method for color CRTs, comprising a step of sequentially performing following current passages (A) and (B) within a vertical retrace period of a color CRT:

(A) passing, through a degaussing coil of the color CRT, a first damped oscillation current which starts with a specified polarity and which swings both positively and negatively; and (B) passing, through the degaussing coil of the color CRT, a second damped oscillation current opposite in polarity to the first damped oscillation current.

* * * * *

UNITED STATES PATENT AND TRADEMARK OFFICE
CERTIFICATE OF CORRECTION

PATENT NO.    : 6,635,994 B1                                              Page 1 of 1
DATED         : February 10, 2004
INVENTOR(S)   : Kiya et al.

It is certified that error appears in the above-identified patent and that said Letters Patent is hereby corrected as shown below:

Title page,
Item [75], Inventors, "Kiya Yoshiyuki, Kubota Osamu, Hamada Tokihiko, Yoda Seiji, Hirose Haruo" should read -- Yoshiyuki Kiya, Osamu Kubota, Tokihiko Hamada, Seiji Yoda, Haruo Hirose --

Signed and Sealed this

Fifteenth Day of February, 2005

JON W. DUDAS
*Director of the United States Patent and Trademark Office*